Feb. 16, 1960 S. KATZ ET AL 2,925,327
CONTINUOUS GAS ANALYZER
Filed March 13, 1958 2 Sheets-Sheet 1

INVENTORS
Sidney Katz &
Charles W. Weber
BY
ATTORNEY ated Feb. 16, 1960

2,925,327

CONTINUOUS GAS ANALYZER

Sidney Katz and Charles W. Weber, Oak Ridge, Tenn., assignors to the United States of America as represented by the United States Atomic Energy Commission Application March 13, 1958, Serial No. 721,324

2 Claims. (Cl. 23—255)

This invention relates to a novel process and apparatus for continuously, accurately, and dynamically measuring the concentration of one selected gas in a flowing gas mixture, and more especially to a process and apparatus adapted to provide precise measurements of concentration of the selected gas despite the presence of randomly-varying amounts of other gases in the mixture.

There are many disadvantages in the use of known batch systems for intermittent analysis of gas mixtures. In these systems a reciprocating pump is used to momentarily isolate a batch of gas, another gas is added, and the change in volume of the gas mixture being analyzed is made to indicate the percentage of the desired constituent. For example, a pump system requires the considerations of leaks, corrosion, mechanical failure, lubrication, and frictional binding. Moreover, where gases must be handled at reduced or at elevated temperatures, the dimensional tolerances in pump components become a critical matter. In addition, since the response from a pump system is truly intermittent in nature, it contains more inherent lag than does a dynamic-response system.

In our improved system, we have overcome the above disadvantages by providing a true dynamic system in which the desired concentration is measured continuously and automatically over long periods, with a minimum of zero drift.

With a knowledge of the shortcomings of prior gas analysis apparatus, it is an object of this invention to provide an analyzer for making precise measurements of mole percent of a selected gas despite the presence of randomly varying amounts of other gases in the mixture.

It is another object of this invention to provide an analyzer which will respond rapidly to gross changes in the content of the selected gas under analysis.

It is still another object of this invention to provide an analyzer for measuring the selected gas concentration continuously and automatically over long periods with a minimum of zero drift.

Figure 1:
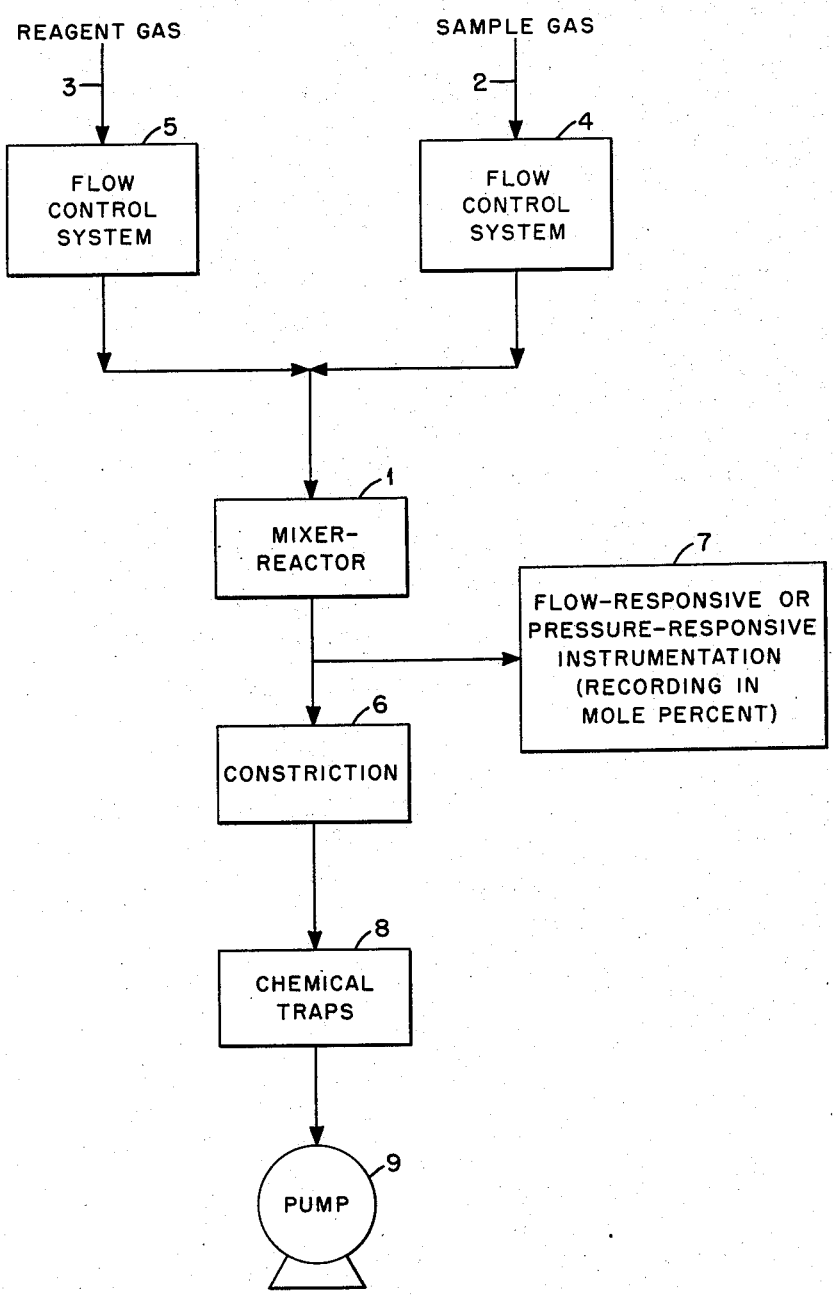
Figure 2:
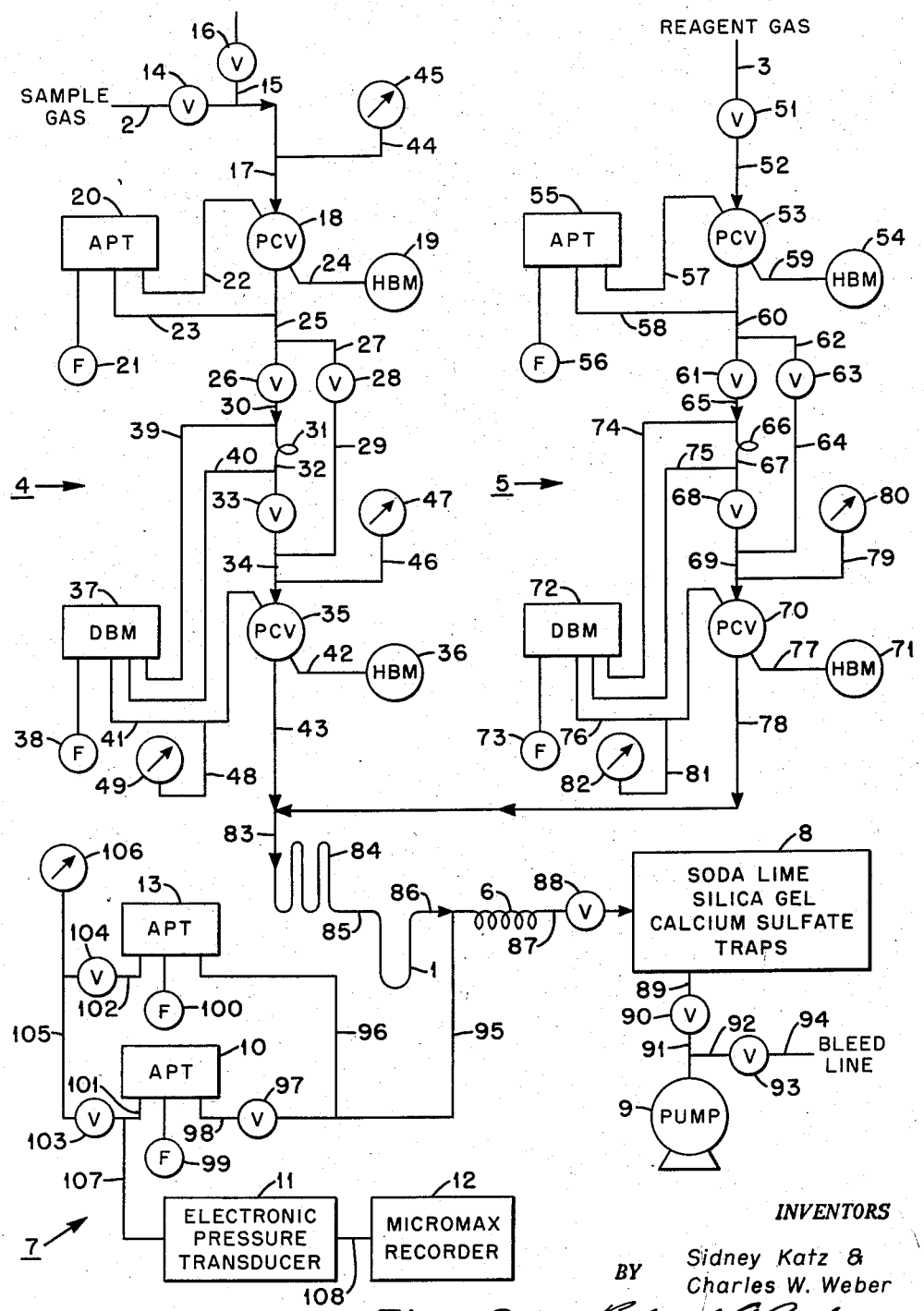

These and other objects and advantages of this invention will be apparent from a consideration of the detailed description following in connection with the drawings, wherein:

Figure 1 is a simplified schematic diagram of a continuous analyzer utilizing the principles of the invention, and Figure 2 is a more detailed schematic diagram of the system of Figure 1.

Briefly, the operation of a preferred form of our analyzer, as illustrated with fluorine gas, is as follows: A reagent gas and a sample of the fluorine-containing gas are chemically combined on a continuous basis in a reaction zone maintained at a selected temperature. The reagent gas and the sample gas are introduced to the reaction zone at preselected, constant molar rates of flow. The flow of the reagent gas is made sufficient to ensure an excess over stoichiometric requirements for reaction with the fluorine. The reagent gas and the fluorine in the sample gas combine in the reaction zone to form a product gas, the reagent being preselected to provide a reaction wherein the number of moles of the product gas is different from the sum of the moles of the reactants. The product gas and any unreacted gases are withdrawn continuously from the reaction zone, and the exit gas stream is monitored continuously to provide an indication of the molar flow rate thereof. The difference in the total molar rates of flow into and out of the reaction zone is then directly related to the fluorine content of the sample gas. Consequently, the analyzer is calibrated in terms of the fluorine concentration in the sample gas.

Referring to Figure 1, reference numeral 2 designates an input line for a sample gas and numeral 3 is an input line for a reagent gas. The sample gas is fed to a flow control system 4 and the reagent gas is fed to a flow control system 5. These systems maintain preselected molar flow rates of the gases. A helical tube or any other suitable mixer-reactor 1 is connected to receive the outputs from flow control systems 4 and 5. A capillary or other suitable flow constriction 6 is connected to receive the output from the reactor 1. Connected into the outlet line of the reactor 1 is an instrumentation system 7 which is responsive to molar rate of flow or, alternatively, to pressure. The instrumentation system 7 is calibrated, with sample gases of known fluorine content, to record in terms of mole percent fluorine.

As shown, the constriction 6 is connected, through protective chemical traps 8, to the inlet of a vacuum pump 9. The vacuum pump is adapted to maintain a constant pressure at the exit end of the constriction 6. Means (not shown) are provided for maintaining the reactor 1 at a selected temperature, and preferably means also are provided for maintaining the gas input systems 2 and 3 at a constant temperature.

Referring now to Figure 2, the flow control systems 4 and 5, and the flow-responsive instrumentation 7 are shown in more detail. The sample gas is fed through line 2, valve 14 and line 17 to a pressure control valve 18. The flow through valve 18 is regulated by an absolute pressure transmitter 20, so that the valve 18 has an output through line 25 of a substantially constant pressure. The transmitter 20 has an input through line 23 from a pressure probe mounted in line 25, and another input from a standard source of air supply 21. The output of the transmitter 20 is fed through line 22 to a control mechanism, such as a diaphragm, in the valve 18 to thus control the flow through the valve to maintain a constant pressure output. The control mechanism in the valve 18 is connected through a line 24 to a constant pressure source such as a hand blind multiplier 19.

The output from the pressure control valve 18 is fed through line 25, valve 26, line 30, capillary 31, line 32, valve 33 and line 34 to a pressure control valve 35. The control valve 35 is regulated by the differential transmitter 37 which has an input from a constant air supply 38 and a differential input from lines 39 and 40 connected across the capillary 31. The output from the transmitter 37 is fed through line 41 to a control mechanism in the control valve 35. This control mechanism is also connected through a line 42 to a constant pressure source 36. The output from the control valve 35 is fed through lines 43 and 83 to the mixer 84 and through line 85 to the reactor 1. The line 17 is connected by a line 44 to a meter 45, line 34 is connected by a line 46 to a meter 47, and line 41 is connected by a line 48 to a meter 49. These meters give a ready indication of the pressure conditions at various stages in the flow control system. Line 25 is connected by line 27, bypass valve 28 and line 29 to line 34. This bypass around valve 26, capillary 31 and valve 33 is a means for purging the system and for initially equalizing the pressure across the capillary 31. A source of reference gas is connected through valve 16 and line 15 to line 17 for a calibration check.

The reagent gas is fed through a flow control system identical to that through which the sample gas is fed. The reagent gas is fed through line 3, valve 51, line 52 to pressure control valve 53. The output of valve 53 is fed through line 60, valve 61, line 65, capillary 66, line 67, valve 68 and line 69 to pressure control valve 70. The output of valve 70 is fed through line 78 to the input of the mixer-reactor. Line 60 is connected through line 58 to the absolute pressure transmitter 55. A source of constant air supply 56 is also connected to transmitter 55. The output of transmitter 55 is connected through line 57 to the control mechanism of valve 53, said control mechanism also being connected by line 59 to a reference source of pressure 54. A bypass around valve 61, capillary 66 and valve 68 is effected by a line 62, valve 63 and line 64. Lines 74 and 75 connected across capillary 66 provide an input to the differential transmitter 72 which also has an input from a constant air supply 73. The output of transmitter 72 is connected by a line 76 to a control mechanism in the pressure control valve 70, said control mechanism also being connected by a line 77 to a source of reference pressure 71. Line 69 is connected by a line 79 to a meter 80, and line 76 is connected by a line 81 to a meter 82.

The inlet pressure control valves 18 and 53 regulate the metering pressure to the capillaries 31 and 66, respectively. The pressure control valves 35 and 70 regulate the flow by receiving the output of the differential pressure transmitters 37 and 72, respectively, applied across the metering capillaries 31 and 66, respectively. The constancy of the metering (absolute) pressure and the measuring and controlling of the differential pressure across the capillary which is not affected by the density of the gas mixture, establishes a suitable flow control system.

The control of the standard volumetric flow by controlling the ΔP (pressure drop across the capillary) is defined as follows:

$$Q_s = \frac{\Delta P(P1+P2)}{Kn}$$

where $Q_s$ = standard volumetric flow
$P1$ = pressure at capillary inlet
$P2$ = pressure at capillary outlet
$\Delta P$ = pressure drop across the capillary
$n$ = viscosity of the gas
$K$ is a constant Since the temperature and the capillary dimensions are maintained constant, the important variables affecting the flow rate are gas viscosity, sum of pressures $(P1+P2)$ and $\Delta P$. However, the instrumentation of the flow control systems (Figure 2) is adapted to maintain relatively constant P1 and P2 pressures and to control the value of ΔP which is very small compared to the values of P1 and P2. Since a capillary type flow control is affected by gas viscosity, some flow fluctuation may be expected for mixtures of more than two gases. However, this fluctuation is often small for the reason that the viscosity of fluorine approximates that of most of the other gases expected in the sample mixture. Since the ΔP, the sum of the pressures P1 and P2, and $n$ are relatively constant, the flow control system set forth above will yield the required constant standard volumetric flow $Q_s$.

The output gas stream of the reactor 1 in Figure 2 is fed through line 86, flow constriction 6, line 87 and valve 88 to the chemical traps 8. The output of the traps 8 is fed through line 89, valve 90, line 91 to the inlet of a vacuum pump 9. The vacuum pump is adapted to maintain a constant pressure at the exit end of the constriction 6. Line 91 is connected by a line 92 and valve 93 to a bleed line 94.

The output pressure of the reactor 1 is also fed by lines 86 and 95, valve 97 and line 98 to an absolute pressure transmitter 10. A branch line 96 from line 95 is connected to an absolute pressure transmitter 13. Transmitters 10 and 13 are connected to a source of constant air supply 99 and 100, respectively. The outputs of transmitters 10 and 13 are connected by lines 101 and 102 and valves 103 and 104, respectively, to a common line 105 which is connected to a meter 106. Line 101 is also connected by a line 107 to an electronic pressure transducer 11 which is connected by a line 108 to a micromax recorder 12. Recorder 12 is calibrated in mole percent fluorine.

The transmitter 10 is designed to operate in the normal expected range of concentrations and is normally connected in the system. The transmitter 13 is designed to encompass the range of transmitter 10 and is used when the system is operating outside (above or below) the range of transmitter 10 and also when the system is being checked for leaks.

Sulfur dioxide ($SO_2$) was selected to be the reagent gas, yielding sulfuryl fluoride ($SO_2F_2$) as the product gas in accordance with the following reaction:

$$SO_2 + F_2 \rightarrow SO_2F_2$$

Preferably, the reactor is operated at a temperature in excess of 190° C. to ensure complete reaction of the $SO_2$ and $F_2$, but care should be taken to avoid operating at too high a temperature which would cause decomposition of other gases in the mixture if it is desired to later utilize such other gases, and to avoid any appreciable reaction between such gases and $SO_2$. The input flows to the reactor can differ radically provided that the selected flow rates are maintained constant, that a sufficient excess of reagent is employed, and that the flows are in proper relation to the reactor volume to ensure a suitable residence time.

The use of $SO_2$ as the reagent to be reacted with $F_2$ is not a critical requirement of the fluorine analyzer. Carbon monoxide and ethylene are examples of the several other reagent gases which could be employed with acceptable results. Sulfur dioxide is, however, a particularly suitable reagent for fluorine analysis, since $SO_2$ does not react appreciably with $F_2$ at low temperatures. Moreover, $SO_2$ reacts with $F_2$ to give a product gas which is relatively inert, and the reaction is quantitative. In addition large flows of $SO_2$ are not required, the reaction is rapid and produces a substantial change in the reactor exit flow, $SO_2$ is commercially available as a pressurized liquid, and $SO_2$ does not react with oxygen under the conditions described.

The flow constrictions employed in the aforementioned flow control systems 4 and 5 should be of the same type as the constriction 6. The use of like constrictions in the gas inlet lines and the reactor outlet line partially compensates for variations in sample viscosity (if capillaries are employed) or for variations in molecular weight (if orifice-type constrictions are employed).

In the arrangement of Figure 2, the pressure in the reactor outlet line is measured by comparing the pressure upstream of the capillary 6 with a selected datum pressure enclosed within the transmitter 10 (or 13). It should be apparent that a suitable alternative would be to measure the pressure differential across the capillary itself. It should be apparent also that the analyzer is not limited to a pneumatic indication of concentration. If desired, the fluorine concentration could be determined by monitoring the dielectric constant or the infra-red absorption of the reactor exit gas.

While the subject analyzer has been described herein in terms of the analysis of $F_2$, it is apparent that the analyzer could as readily be adapted for the analysis of SO$_2$, with F$_2$ being employed as the reagent gas. In other applications, Br$_2$ could be used as a reagent gas for the determination of F$_2$, or vice versa; CO and O$_2$ could be used interchangeably in like manner; Cl$_2$ and CO could be so used; and so on. The selection of the technique for monitoring the reactor outlet gas would depend upon the nature of the reaction.

This invention has been described by way of illustration rather than limitation, and it would be apparent that the invention is equally applicable in fields other than those described.

What is claimed is:

1. An improved system for continuously measuring the concentration of a selected gas in a gas mixture, comprising a first constant volumetric flow control system, means for continuously feeding a sample gas mixture to said first system, a second constant volumetric flow control system, means for continuously feeding a reagent gas to said second system, each of said first and second flow control systems comprising a first pressure control valve, an absolute pressure transmitter connected to the output of said valve to regulate said first valve, a second pressure control valve, a first constriction connected between said control valves, a differential pressure transmitter connected across said first constriction, the output of said differential pressure transmitter being connected to regulate said second pressure control valve, a mixer-reactor operating at a preselected temperature, means for feeding the outputs of said first and second systems to said mixer-reactor, the reagent gas and selected gas being characterized by forming a different number of moles of product gas than the sum of the moles of said reagent and selected gases, a second constriction having an input and an output, said second constriction input being connected to the output of the mixer-reactor, evacuation means connected to the output of said second constriction, and a flow-responsive indicating device connected to said mixer-reactor output, the flow rate indicated being a measure of the concentration of said selected gas in said gas mixture.

2. An improved gas detecting system as set forth in claim 1 wherein the said second flow constriction at the output of said mixer-reactor and said first constrictions in the flow control systems are identical in type.

References Cited in the file of this patent

UNITED STATES PATENTS

| | | |
|---|---|---|
| 2,143,041 | Vayda et al. | Jan. 10, 1939 |
| 2,573,649 | Nier | Oct. 30, 1951 |
| 2,593,878 | Haines et al. | Apr. 22, 1952 |